Patented Nov. 30, 1943

2,335,381

UNITED STATES PATENT OFFICE 2,335,381

SULPHUR DYE DERIVED FROM 1-(OMEGA-SULPHO-ALKYLAMINO)-NAPHTHALENES

Newell M. Bigelow, Wilmington, Del., assignor to E. I. du Pont de Nemours & Company, Wilmington, Del., a corporation of Delaware No Drawing. Application May 23, 1941, Serial No. 394,821

9 Claims. (Cl. 260—134)

This invention relates to new sulphur dyes and to methods of manufacturing the same, and especially to such dyes which are obtainable by thionating certain omega-sulpho-alkyl-alpha naphthylamines.

It has been discovered that valuable sulphur dyes can be produced by thionating omega-sulpho-alkyl-alpha-naphthylamines represented in general by the formula

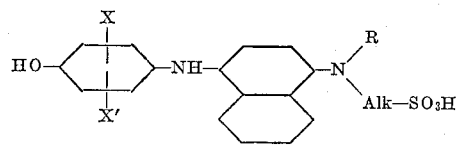

or a corresponding indophenol thereof. In this formula R represents hydrogen, alkyl having 2 to 4 carbons, phenyl, tolyl or xylyl; Alk represents an alkylene group having 2 to 4 carbons or a mono- or di-hydroxy alkylene group having 3 to 4 carbons wherein the terminal carbons are devoid of hydroxy groups and no carbon bears more than one hydroxy group; and X and X' are from a group consisting of hydrogen and halogen.

It is among the objects of the invention to provide new sulphur dyes which produce dyeings on dyeable fibers in shades of blue to green. Another object of the invention is to provide sulphur dyes having unusually high solubility in water and in dilute aqueous solutions of inorganic salts. Another object of the invention is to provide dyes which can be used in their oxidized form to dye textile and other fibrous materials directly. A further object of the invention is to provide dyes which are so soluble in their reduced or leuco form that they permit the use of unusually weak alkaline dye baths for dyeing fibrous materials. Other objects of the invention will be apparent from the following description.

The objects of the invention are attained in general by heating the intermediate in a water, water-soluble alcohol or water-alcohol medium, either in the presence or without an assistant such as copper salt, and thionating by the action of an alkali metal polysulphide. When the thionation is completed, the product may be separated by methods generally known to the art. The products have an unusual solubility characteristic in that they have a relatively high solubility in more and less dilute sodium sulphide solutions and some of them, especially those which are free from metal, are soluble in water. These solutions are used as dye baths. The dyes have affinity for any of the cellulosic fibers commonly dyed with sulphur dyes and the new dyes can be used in dilute sodium sulphide and neutral water solutions to dye fibers, such as paper, wool and silk.

The invention will be more fully set forth in the following more detailed description which includes examples that are given as illustrative embodiments of the invention and not as limitations thereof. Parts are expressed in parts by weight unless otherwise noted.

Example 1

A solution of 0.76 part of the sodium salt of 1-(omega-sulpho-ethyl-amino)-naphthalene and 0.11 part of sodium hydroxide in 10 parts of water was cooled to 0° C. At this temperature, 0.30 part of p-amino-phenol was added. The solution was agitated until solution was complete. Five parts of crushed ice were added; then 0.41 part of sodium hypochlorite in the form of an aqueous solution was added to the vigorously agitated solution over the course of a few minutes. The solution was agitated at or below 0° for a few minutes; then a solution of 1.47 parts of sodium sulphide hydrate ($Na_2S.9H_2O$) in a small amount of water was added, and the solution was agitated for an hour, the temperature being allowed to rise slowly to 25° C. The sodium salt of 1-(omega-sulpho-ethyl-amino)-4-(p'-hydroxy-anilino)-naphthalene formed by these reactions was isolated from the reaction mixture by the addition of salt. The mixture was filtered and washed with 20% sodium chloride solution until the washings had become light colored. The product was held in the form of a moist paste. The yield on a dry basis was approximately 1.0 part.

Sodium polysulphide was prepared by refluxing a mixture of 2.51 parts of crystalline sodium sulphide ($Na_2S.9H_2O$), 1.67 parts of sulphur and 5.00 parts of water. When all of the sulphur was in solution, 1.00 part of the sodium salt of 1-(omega-sulpho-ethyl-amino)-4-(p'-hydroxy-anilino)-naphthalene, the preparation of which has just been described, was added. More water was added until the total amount, including that in the sodium sulphide and in the moist paste of leucoindophenol, was 10.0 parts. The mixture was refluxed vigorously for 60 hours, with good agitation. At the end of this time the mixture was transferred to a vessel equipped with an agitator and means for heating the solution and for passing air through it. The reaction mixture was diluted with 15 parts of water and warmed to approximately 95° C. Air was passed through the hot agitated solution. Solid sodium carbonate was added from time to time in quantity sufficient to keep the reaction mixture alkaline to phenolphthalein paper. From time to time, small samples of the mixture were diluted with twice their volume of saturated sodium chloride solution. Drops of the resulting suspension were placed on filter paper. When the "out-spread" from the central spot of the drop was pure blue in color, with no greenish or yellowish rim, the aeration was stopped. Sodium chloride was added to the solution until precipitation of the dye was complete. The mixture was then filtered. The filter cake was washed with 20% sodium chloride solution until the washings were neutral or very weakly alkaline to phenolphthalein paper. The crude filter cake composed of the thionation product was dried.

The sulphur dye thus obtained was soluble in water, either in its oxidized state or after reduction with sodium sulphide or sodium hydrosulphite. Cotton goods, immersed in a bath of the reduced dye and then exposed to the air, or developed in a bath of sodium perborate, was dyed in bright greenish-blue shades. The fastness properties of the dyeings were excellent. Silk, wool and rayon fabrics immersed in a neutral or weakly alkaline solution of the reduced dye and then oxidized, were dyed in similar shades. The fibers were not damaged by immersion in the neutral or weakly alkaline solution.

The sodium salt of 1-(omega-sulpho-ethyl-amino)-naphthalene may be prepared by reacting alpha-naphthyl-amine with sodium bromethane sulphonate in the manner described by R. Rumpf, Bull. Soc. (5) 871 (1938) for the analogous compound, 1-anilino-ethane-2-sodium sulphonate.

Example 2

An aqueous solution of sodium polysulphide was prepared in the manner described in Example 1. To the polysulphide were added 1.00 part of the sodium salt of 1-(omega-sulpho-ethyl-amino)-4-(4'-hydroxy-anilino)-naphthalene (dry basis) and 0.26 part of copper sulphate pentahydrate ($CuSO_4.5H_2O$), dissolved in a small amount of water. The mixture was refluxed for 60 hours, and the reaction product isolated in the manner described in Example 1. The thionation product was soluble in water, either in its oxidized or reduced form. Cotton goods, immersed in a warm alkaline solution of the reduced dye and then developed, were dyed in bright, strong green shades. Wool, silk or rayon, dyed from a neutral or weakly alkaline solution of the reduced dye and then oxidized, were colored in similar shades. The fastness of the dyeings to light and laundering was excellent.

Example 3

1-(omega-sulpho-ethyl-amino)-4-(3'-chloro-4'-hydroxy-anilino)-naphthalene was prepared by the oxidation of equivalent amounts of the sodium salt of 1-(omega-sulpho-ethyl-amino)-naphthalene and 2-chloro-4-amino-phenol with sodium hypochlorite, followed by reduction of the indophenol with sodium sulphide, as described in Example 1. In this case the alkaline solution of the leucoindophenol was acidified at 0° with hydrochloric acid; the precipitated product in the form of the free acid was filtered off, washed with sodium chloride solution, and held as a moist paste.

One part (dry basis) of the leucoindiphenol thus prepared was added to a solution of sodium polysulphide, prepared by refluxing a mixture of 1.22 parts of sodium hydroxide, 2.94 parts of sulphur, 4.9 parts of the mono-ethyl ether of ethylene glycol and one part of water. Sufficient additional water was added to make the total amount of water, including that present in the moist leucoindophenol, equal to 4.9 parts. The mixture was refluxed vigorously, with agitation, for 20 hours. At the end of this time, the reaction mixture was diluted with 15 parts of water, and then distilled until 15 parts of a mixture of the mono-ethyl ether of ethylene glycol and water had been removed. Fifteen parts of water were again added; the solution was transferred to an oxidizing kettle and aerated at a temperature of approximately 75°. Sodium hydroxide was added in small portions at frequent intervals, the mixture being kept weakly alkaline to Clayton Yellow paper. When all of the residual sulphur had been oxidized and the dye transformed to its oxidized form (as evidenced by the spot test described in Example 1), the aeration was stopped. The reaction mixture was treated with sodium chloride, filtered, and the filter cake was washed with 20% sodium chloride solution until the washings were neutral or at most weakly alkaline to phenolphthalein paper. The dye was dried at 70°. This product dyed cotton in blue shades which were somewhat greener than the dye described in Example 1. Its physical and tinctorial properties were similar to those of the latter dye.

Example 4

A solution of 0.664 part of the sodium salt of 1-(omega-sulpho-ethyl-amino)-naphthalene and 0.1 part of sodium hydroxide in eight parts of water was chilled to 0° C. To this solution was added 0.392 part of dichlor-p-aminophenol. The mixture was agitated until solution was complete. Four parts of crushed ice was added; then 0.329 part of sodium hypochlorite in the form of an aqueous solution was added to the vigorously agitated solution over the course of the few minutes. The solution was agitated at or below 0° for a few minutes; then a solution of 1.47 parts of sodium sulphide ($Na_2S.9H_2O$) in a small amount of water was added. The solution was agitated for an hour, its temperature being allowed to rise slowly to 20°. At the end of this time, the solution was again chilled to 5° and acidified at this temperature with hydrochloric acid. The leucoindophenol which separated out in crystalline form was filtered, washed with 20° salt solution until acid free and dried in a vacuum oven at 50°.

For the thionation of this intermediate, sodium polysulphide was prepared by refluxing the mixture of 1.51 parts of crystalline sodium sulphide, 1.41 parts of sulphur, and 8.0 parts of denatured ethyl alcohol until all of the sulphur had gone into solution. To the polysulphide was added 1.00 part of the leucoindophenol, the preparation of which has just been described. The mixture was refluxed for 80 hours. At the end of this period the alcohol in the mixture was distilled off and replaced by water. Then the reaction mixture was diluted with three times its volume of water. Five parts of sodium hydroxide was added and the mixture was heated at or near its boiling point for two hours. At the end of this time, the solution was cooled to room temperature and acidified with 30% sulphuric acid. The precipitated dye was filtered off, washed with 20% sodium chloride solution until acid free, and dried.

The dye so prepared resembled the dye described in Example 1 in its physical and tinctorial properties. It dyed cotton, wool and silk in greenish blue shades, greener than those produced by the dye described in Example 1. Aftertreatment of the dyed fiber with solutions of sodium perborate or hydrogen peroxide brightened the shade of the dye.

Example 5

1 - (3':5'-dichlor-4'-hydroxy-anilino)-4-(ethyl-beta-sulpho-ethyl)-amino-naphthalene sodium salt was prepared as described in Example 4. An alcoholic solution of sodium polysulphide was prepared as described in the same example. One part of the leucoindophenol was added to the polysulphide solution; then a solution of 0.18 part of copper sulphate pentahydrate in a small amount of water was added to the thionation mass. The thionation was carried out and the dye isolated as described in Example 4. The dye thus produced was readily soluble in water, although its solubility was not as marked as the products described in the preceding examples. Cotton, wool, silk or rayon fibers, immersed in a neutral or weakly alkaline solution of the reduced dye, and then developed in a dilute solution of sodium perborate or hydrogen peroxide, were colored a bright green. The fastness properties of the dye to light and laundering were excellent.

The sodium salt of 1-(ethyl-omega-sulpho-ethyl-amino)-naphthalene used in this example was prepared by heating a mixture of 1.0 part of ethyl-alpha-naphthylamine, 1.3 parts of sodium bromethane sulphonate, 0.3 part of calcium carbonate, 0.02 part of metallic copper and 6.0 parts of ethyl alcohol in an autoclave at 140° for 16 hours. At the end of this time, the alcohol was replaced with water by distillation, calcium salts were decomposed by treatment with potassium carbonate, and the mixture was clarified. Saturation of the clarified solution with sodium chloride precipitated the 1-(ethyl-omega-sulpho-ethyl-amino)-naphthalene in crystalline form.

Example 6

An aqueous solution of sodium polysulphide was prepared by refluxing a mixture of 1.05 parts of sodium hydroxide, 1.26 parts of sulphur and 6.0 parts of water until the sulphur was completely dissolved. To this polysulphide solution was added 1.00 part of 1-(4'-hydroxy-anilino)-4-(phenyl-omega-sulpho-ethyl) - amino - naphthalene sodium salt, prepared from 1-(phenyl-omega-sulpho-ethyl-amino) - naphthalene and p-amino-phenol by the method described in Example 1. The mixture was refluxed vigorously for forty hours. At the end of the reflux period, the mixture was diluted with 18.0 parts of water. The resulting mixture was warmed to 75° and aerated; during this operation the solution was kept alkaline to Clayton Yellow paper by frequent additions of small amounts of sodium hydroxide. When a drop of the reaction mixture, placed on filter paper, gave a dark central spot surrounded by a clear blue out-spread, the aeration was interrupted. The dye was filtered, washed with 20% sodium chloride solution until essentially free of alkali and dried. The dye so produced was not as soluble in water as those described in Examples 1 or 3. Dissolved in warm, dilute sodium sulphide solution, it dyed cotton a deep blue shade.

Example 7

An aqueous solution of sodium polysulphide was prepared by refluxing a mixture of 2.58 parts of sodium sulphide monohydrate, 1.72 parts of sulphur and 6 parts of water. To the solution was added 1.00 part of 1-(4'-hydroxy-anilino)-4 - (gamma-sulpho-propyl-amino)-naphthalene. The mixture was refluxed for 60 hours. At the end of this time the thionation mixture was diluted with twice its volume of water. The solution was warmed to 95° and held at this temperature while a vigorous current of air in finely divided bubbles was passed through the solution. Sodium carbonate was added from time to time, in quantities sufficient to keep the mixture strongly alkaline to phenolphthalein paper. When the aeration was completed, the dye was filtered, washed with sodium chloride solution and dried.

The dye produced from this intermediate was very soluble in water, both in its oxidized or its reduced form. It dyed cotton, wool, silk or rayon in bright greenish blue shades from a neutral or weakly alkaline bath. The fastness of the dye to light and laundering was very good.

Example 8

To a thionation mixture of 1-(4'-hydroxy-anilino)-4-(gamma-sulpho-propyl- amino) - naphthalene prepared as described in the preceding example was added a solution of 0.20 part of copper sulphate pentahydrate in the minimum amount of water. The thionation was then carried out and the dye isolated as described in the preceding example. The copper-containing dye produced in this manner was soluble in water, although its solubility was not as great as that of the corresponding copper-free dye. It dyed cotton, silk, wool and rayon in bright green shades.

Example 9

A solution of sodium polysulphide was prepared by the reaction of 2.01 parts of sodium sulphide monohydrate and 1.34 parts of sulphur in 4.0 parts of water and 2.0 parts of the mono-ethyl ether of ethylene glycol. To this polysulphide solution was added 1.00 part of 1-(3':5'-dichlor-4'-hydroxy-anilino)-4-(methyl-omega - sulpho-propyl-amino)-naphthalene sodium salt in the form of a moist paste. Enough water was added to the thionation mass to correspond to a total of 8.0 parts of water from all sources. The mixture was refluxed for 30 hours. At the end of this time the reaction mixture was steam distilled until essentially all of the organic solvent had been removed. Then the mixture was diluted with 10 parts of water. Sodium bisulphide (1.47 parts) and sodium sulphite (1.98 parts) were added, and the mixture was digested at 90-95° for 4 hours. Then the hot mixture was filtered; the precipitate was washed with 20% sodium chloride solution and dried.

This product resembled the dye described in Example 4 in its physical and tinctorial properties. It was deeper and slightly redder in shade.

1-(methyl - omega - sulpho - propyl - amino) - naphthalene was prepared by the reaction of methyl-alpha-naphthylamine and sodium-chloro-propane sulphonate according to the method described by Tsunoo (Ber. 68B 1334 (1935)) for the analogous methyl-anilino-2-hydroxy-propane-3-sodium sulphonate.

Example 10

Sodium polysulphide was prepared from 1.32 parts of fused sodium sulphide (60% pure), 1.63 parts of sulphur, 8.0 parts of water and 2.0 parts of the mono ethyl ether of ethylene glycol. To the polysulphide solution was added 1.00 part of 1-(4'-hydroxy-anilino)-4-(beta-hydroxy-alpha-sulpho-propyl-amino)-naphthalene sodium salt. The mixture was refluxed for 30 hours. Then the solution was diluted with 20 parts of water, warmed to 70° and held at this temperature while a vigorous current of air was blown through it. The mixture was kept slightly alkaline to Clayton Yellow paper by additions of small amounts of sodium hydroxide as needed. When all of the excess polysulphide had been converted to thiosulphate and the precipitation of the dye was complete, 5 parts of sodium chloride was added to the mixture. When this was dissolved, the mixture was filtered. The filter cake was washed with 20% salt solution until the washings were colorless; then dried.

The product of this reaction was exceedingly soluble in water, either in its oxidized or reduced state. The dye, applied to cotton in the usual manner from a sulphide bath, colored the fiber a bright blue. The color was rather fugitive to laundering, probably due to its high solubility. When a portion of this dye, followed by a similar amount of alum, was added to an aqueous suspension of paper pulp in a beater, the paper was dyed a strong grayish blue. This dyeing on paper pulp exhibited good fastness properties.

1-(beta-hydroxy-gamma-sulpho-propylamino)-naphthalene was prepared by the method described by Tsunoo (Ber. 68B, 1334, (1935)) for the phenyl analogue.

*Example 11*

The thionation described in Example 10 was repeated, with the exception that 0.25 part of copper sulphate pentahydrate, dissolved in a small amount of water, was added to the reaction mixture at the start of the thionation. The thionation and the isolation of the thionation product were performed as described in Example 10. The dye so produced was readily soluble in water, although less soluble than the dye described in Example 9. It dyed cotton, wool, and silk in bright green shades. It was also applicable as a beater dye for paper.

*Example 12*

A solution of sodium polysulphide was prepared in the usual manner from 2.22 parts of crystalline sodium sulphide, 1.19 parts of sulphur and 6.0 parts of water. To the polysulphide solution was added 1.00 part of 1-(4'-hydroxy-anilino)-4-(propyl-omega-sulpho-butylamino)-naphthalene in the form of a moist paste. Enough water was added to equal a total of 10 parts of water from all sources. The mixture was refluxed for 40 hours. At the end of this time the reaction mixture was diluted and blown with air as described in Example 10. The dye isolated in this manner dyed cotton in greenish blue shades from a sodium sulphide bath, and dyed wool and silk without injury to the fiber from a sodium carbonate-sodium hydrosulphite bath or a neutralized sulphide bath.

Any of the leucoindophenols represented by the formula

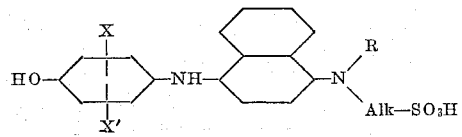

or the indophenol thereof can be used to make the new dyes. In this formula R represents hydrogen, alkyl having 2 to 4 carbons, phenyl, tolyl or xylyl; Alk represents an alkylene group having 2 to 4 carbons or a mono- or di-hydroxy alkylene group having 3 to 4 carbons wherein the terminal carbons are devoid of hydroxy groups and no carbon bears more than one hydroxy group; and X and X' are from a group consisting of hydrogen and halogen, such as chlorine, bromine and fluorine. The substituent groups X and X' may be alike or different.

The leucoindophenols which are variously substituted by X and X' groups can be made by using a corresponding aniline instead of para-amino-phenol as in the procedure of Example 1. The thionated products made from such substituted leucoindophenols give dyeings in various modified shades of blue and green. The general properties are otherwise similar to the dyes of the foregoing examples.

The copper-containing dyes are similar in properties to the analogous dyes which do not contain copper, except that the copper-containing dyes are yellower than the blue to greenish-blue copper-free analogues. In making the copper-containing dyes, copper in the form of the metal or as a soluble salt of copper can be introduced into the thionation medium, such as finely divided copper, copper sulphide, copper sulphate and the like. The maximum greenness may be obtained when the medium contains sufficient copper to form a complex containing about 0.6 to about 0.8 atom of copper per two molecules of the leucoindophenol. Intermediate shades can be produced by combining smaller amounts of copper. Slightly larger amounts may also be combined. The copper complex is probably formed immediately by the action of a copper sulphide which is produced by the action of the thionation medium on the copper or copper compound. A copper complex will be formed when any amount of copper sulphide is present in the thionation medium but an excess of copper over the maximum which will combine with the thionation product may be present in the medium. That a copper complex is formed is evident from the fact that the copper cannot be removed without decomposition or material alteration of the dye. The exact structure of the copper complex is not known to me and no attempt is made to represent it structurally.

Water, water-soluble monohydric or polyhydric alcohols, or mixtures of these alcohols with water may be used as thionation media. Ethyl alcohol, butyl alcohol or a mono-alkyl ether of ethylene glycol, such as the mono-ethyl ether of ethylene glycol ("Cellosolve") function well as thionation media, as do mixtures of these solvents with water. The specific shade of the dye produced from a given intermediate varies slightly with the medium in which the intermediate is thionated. For the best uniform results, we prefer to use as the thionation medium a mixture containing about 10% to about 20% of mono-ethyl ether of ethylene glycol and the remainder water, or water containing up to 5% of ethyl alcohol, but the invention is not restricted to the use of such a medium.

Alkali metal polysulphides, particularly sodium polysulphide, is used as the source of sulphur in the thionation. The sulphur:sulphide ratio of the polysulphide does not play a critical role in the thionation, provided that a sufficient amount of sulphur is available. Four moles of sodium hexasulphide per mole of indophenol of leucoindophenol is about the optimum relationship. Less polysulphide, or polysulphide with a lower ratio of sulphur to sulphide produces a satisfactory dye, but the yields are somewhat lower and the thionation requires a longer time for completion. The use of an excess of such polysulphide, or the use of a polysulphide with a higher ratio, such as sodium octasulphide, is feasible without altering the course of the reaction or the quality of the product, but its use offers no advantage except to insure the presence of sufficient active thionation agent. However, the solvent used must be taken into account in choosing the polysulphide. If water alone is to be used as the medium, the sulphur:sulphide ratio should not be higher than that represented by sodium pentasulphide; otherwise the mixture at the end of the thionation may contain lumps of undissolved sulphur, the removal of which will cause unnecessary trouble. When organic solvents are present in the thionation mixture, the presence of undissolved sulphur is avoided.

The thionation period depends to some extent on the solvent used. Thionations in ethyl alcohol may require periods as long as 80 hours for completion. The use of higher boiling solvents shortens the required time considerably. Thionations carried out in water or aqueous "Cellosolve" are finished in about 30–45 hours. The strength of the polysulphide used also has an effect in determining the proper reaction period; high-ratio polysulphide permits a shorter thionation period than low-ratio polysulphide. For each set of conditions, the proper thionation period must be determined by actual experiment. Insufficient thionation is indicated by low yields; unduly long periods have little effect on the yield, but may bring about dullness in the finished dye.

The thionation temperature is controlled by the choice of solvent. I prefer to carry out the thionation at its normal boiling point under atmospheric pressures. It may, however, be carried out under reduced or elevated pressures, with corresponding alterations of the reaction temperature.

When the thionation is finished, the dye may be isolated from the thionation mass by any of the methods known to those skilled in the art. The crude mixture may be freed from sulphur by digestion with an excess of sodium hydroxide and the dye isolated by acidification of the solution, or residual sulphur may be removed by digestion of the mixture with sodium bisulphite and the dye isolated by filtration. Alternatively, the dye may be isolated by the passage of air through the diluted thionation mass in the presence of alkalies. We prefer the latter method, since the aeration appears to increase the brightness of the dye, but the invention is not restricted to any particular method of isolation.

The dyes produced by the thionation of indophenols or leucoindophenols derived from the described omega - sulphoalkyl - alpha-naphthylamines are characterized by unusually high solubility. This characteristic is particularly evident among the copper-free dyes which are soluble in water, even in their oxidized form. The copper-free dyes in their oxidized form may be used for the direct dyeing of cotton, wool or silk from a neutral bath, although dyeings so produced are not as strong as those produced by dyeing from a sulphide bath. An aqueous solution of the oxidized dye may be used in dyeing paper pulp in the beater. Similarly, a sodium sulphide bath containing the reduced dye may be brought almost to neutrality by the addition of acids or alkali binding agents and wool, silk or other animal fibers may be dyed from such a dye bath without injuring the fiber which always attends the dyeing of such fibers from a more strongly alkaline bath.

For reasons of technical convenience, ease in handling and uniformly excellent properties of the products, I prefer to use the leucoindophenols prepared by the oxidation of the omega-sulpho-alkyl-alpha-naphthylamines and p-aminophenol with hypochlorite, followed by reduction to the leucoindophenol or the indophenols analogous thereto.

From the foregoing disclosure it will be recognized that the invention is susceptible of modification without departing from the spirit and scope thereof and it is to be understood that the invention is not restricted to the specific illustrations thereof herein set forth.

I claim:

1. A sulphur dye of the group consisting of the dyes obtainable by thionating an omega-sulpho-alkyl-alpha-naphthylamine and the copper-containing analogues thereof which are produced by said thionations in the presence of a copper salt, said omega - sulpho - alkyl - alpha - naphthylamine being represented by the formula

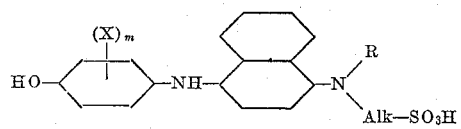

wherein R is one of a group consisting of hydrogen, alkyl having 2 to 4 carbons, phenyl, tolyl and xylyl; Alk represents one of a group consisting of alkylene bridging groups represented by the formula —$C_nH_{2n}$— wherein $n$ is 2 to 4, and mono- and di-hydroxy alkylene bridging groups having 3 to 4 carbons wherein the terminal carbons are devoid of hydroxy groups and no carbon atom bears more than one hydroxy group; X is from a group consisting of hydrogen and the halogens; and $m$ is an integer not greater than 2.

2. A sulphur dye of the group consisting of the dyes obtainable by thionating an omega-sulpho-alkyl-alpha-naphthylamine and the copper-containing analogues thereof which are produced by said thionations in the presence of a copper salt, said omega - sulpho - alkyl - alpha - naphthylamine being represented by the formula

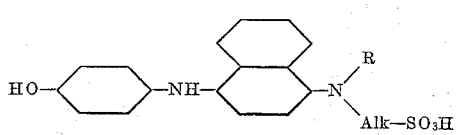

wherein R is one of a group consisting of hydrogen, alkyl having 2 to 4 carbons, phenyl, tolyl and xylyl; Alk represents one of a group consisting of alkylene bridging groups represented by the formula —$C_nH_{2n}$— wherein $n$ is 2 to 4, and mono- and di-hydroxy alkylene bridging groups having 3 to 4 carbons wherein the terminal carbons are devoid of hydroxy groups and no carbon atom has more than one hydroxy group.

3. The sulphur dye obtained by thionating 1-(omega - sulpho - ethyl - amino) - 4 - (p' - hydroxy-anilido) -naphthalene.

4. The sulphur dye obtained by thionating 1-(omega - sulpho - ethyl - amino) - 4 - (p' -hydroxy-anilido) -naphthalene in the presence of a copper salt.

5. The sulphur dye obtained by thionating 1-(beta-hydroxy-gamma-sulpho-propyl-amino)-4-(p'-hydroxy-anilido)-naphthalene.

6. The process which comprises heating one of a group consisting of an omega-sulpho-alkyl-alpha-naphthylamine and the indophenol thereof in a thionation medium until a thionated product is formed which dyes cellulosic fibers from sodium sulphide solutions in shades of blue to green, said omega-sulpho-alkyl-alpha-naphthylamine being represented by the formula

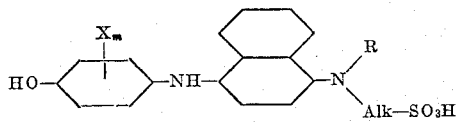

wherein R is one of a group consisting of hydrogen, alkyl having 2 to 4 carbons, phenyl, tolyl and xylyl; Alk represents one of a group consisting of alkylene bridging groups represented by the formula —$C_nH_{2n}$— wherein $n$ is 2 to 4, and mono- and di-hydroxy alkylene bridging groups having 3 to 4 carbons wherein the terminal carbons are devoid of hydroxy groups and no carbon atom bears more than one hydroxy group, X is from a group consisting of hydrogen and the halogens; and $m$ is an integer not greater than 2; and said thionation medium being one of a group consisting of a thionation medium which is devoid of copper and a thionation medium which contains at least sufficient copper to form a copper complex.

7. The process in accordance with claim 6 in which the thionation agent is an alkali metal polysulphide containing at least as high a ratio of sulphur as that contained in sodium hexasulphide, and said agent being present in the proportion of at least four moles per mole of the indophenol.

8. The process in accordance with claim 6 in which at least sufficient copper is present in the thionation medium to form a product containing about 0.6 to about 0.8 atom of copper per two moles of the indophenol which is thionated.

9. The process in accordance with claim 6 in which the thionation medium contains about 10% to about 20% of the mono-ethyl-ether of ethylene glycol and the remainder essentially water.

NEWELL M. BIGELOW.

CERTIFICATE OF CORRECTION.

Patent No. 2,335,381.　　　　　　　　　　　　　　　November 30, 1943.

NEWELL M. BIGELOW.

It is hereby certified that error appears in the printed specification of the above numbered patent requiring correction as follows: Page 1, first column, line 46, before "copper salt" insert --a--; page 4, second column, line 75, for "of leuco-" read -- or leuco- --; and that the said Letters Patent should be read with this correction therein that the same may conform to the record of the case in the Patent Office.

Signed and sealed this 25th day of January, A. D. 1944.

(Seal)

Henry Van Arsdale,
Acting Commissioner of Patents.